(12) United States Patent
Stewart et al.

(10) Patent No.: US 11,704,387 B2
(45) Date of Patent: Jul. 18, 2023

(54) METHOD AND SYSTEM FOR FUZZY MATCHING AND ALIAS MATCHING FOR STREAMING DATA SETS

(71) Applicant: Forcepoint, LLC, Austin, TX (US)

(72) Inventors: Peter Lochlan Stewart, Rowlett, TX (US); Amanda Kinnischtzke, Englewood, NJ (US)

(73) Assignee: Forcepoint LLC, Austin, TX (US)

( * ) Notice: Subject to any disclaimer, the term of this patent is extended or adjusted under 35 U.S.C. 154(b) by 113 days.

(21) Appl. No.: 17/006,384

(22) Filed: Aug. 28, 2020

(65) Prior Publication Data

US 2022/0067427 A1 Mar. 3, 2022

(51) Int. Cl.
| | |
|---|---|
| G06F 18/22 | (2023.01) |
| G06F 40/10 | (2020.01) |
| G06F 16/2455 | (2019.01) |
| G06N 5/048 | (2023.01) |
| G06V 10/75 | (2022.01) |
| G06N 20/00 | (2019.01) |

(52) U.S. Cl.
CPC ........ *G06F 18/22* (2023.01); *G06F 16/24568* (2019.01); *G06F 40/10* (2020.01); *G06N 5/048* (2013.01); *G06N 20/00* (2019.01); *G06V 10/757* (2022.01)

(58) Field of Classification Search
CPC ............... G06K 9/6215; G06K 9/6211; G06F 16/24568; G06F 40/10; G06N 5/048
See application file for complete search history.

(56) References Cited

U.S. PATENT DOCUMENTS

| | | |
|---|---|---|
| 3,990,930 A | 11/1976 | Schmit et al. |
| 6,072,875 A | 6/2000 | Tsudik |
| 6,678,693 B1 | 1/2004 | Shiraishi |
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 3,490,163 A1 | 7/2013 | Harsell et al. |
| 8,484,066 B2 | 7/2013 | Miller et al. |

(Continued)

FOREIGN PATENT DOCUMENTS

WO WO2019153581 A1 8/2019

OTHER PUBLICATIONS

Stymne, S., 2011, July. Spell checking techniques for replacement of unknown words and data cleaning for Haitian Creole SMS translation. In Proceedings of the Sixth Workshop on Statistical Machine Translation (pp. 470-477).*

(Continued)

*Primary Examiner* — Zhitong Chen
(74) *Attorney, Agent, or Firm* — Terrile, Cannatti & Chambers; Emmanuel A. Rivera (57) ABSTRACT

A method, system, and computer-usable medium for streaming or processing data streams. Raw text data is cleansed to a standard format. A fuzzy matching algorithm is performed on the text data. For data where domain expertise is required, alias matching is performed. End state categorizing or grouping is provided for the cleansed raw text data.

20 Claims, 5 Drawing Sheets

(56) References Cited

U.S. PATENT DOCUMENTS

| | | |
|---|---|---|
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Mien et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukeiji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,769,908 B1 | 9/2020 | Burris et al. |
| 10,917,319 B2 | 2/2021 | Scheib et al. |
| 11,061,874 B1 * | 7/2021 | Funk ................. G06F 16/215 |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0059853 A1 * | 3/2012 | Jagota ................. G06F 16/95 707/780 |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |

(56) References Cited

U.S. PATENT DOCUMENTS

| | | |
|---|---|---|
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | Deluca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0334025 A1 | 10/2020 | Wang et al. |

OTHER PUBLICATIONS

Mohammad, F., 2018. Is preprocessing of text really worth your time for online comment classification?. arXiv preprint arXiv:1806.02908.*

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdrs/Semantic_Based_Automated_Reasoning_for_AWS_Access_Policies_Using_SMT.pdf.

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Marinescu, Dan C., Cloud Computing and Computer Clouds, University of Central Florida, 2012, pp. 1-246.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (56) References Cited

OTHER PUBLICATIONS (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Singh et al., Container-Based Microservice Architecture for Cloud Applications, International Conference on Computing, Communication and Automation (ICCCA2017), 2017.

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

\* cited by examiner

METHOD AND SYSTEM FOR FUZZY MATCHING AND ALIAS MATCHING FOR STREAMING DATA SETS

BACKGROUND OF THE INVENTION

Field of the Invention

The present invention relates in general to the field of computers and similar technologies, and in particular to software utilized in this field. Still more particularly, the present invention relates to a method, system, and computer-usable medium for streaming data sets using fuzzy matching and alias matching.

Description of the Related Art

Entities (i.e., customers) may provide data or data sets to be normalized, categorized, and reported to a service such as a data center. Data can include variable content which is entered in data fields. Content in the data fields are typically entered manually and are susceptable to inconsistencies and errors such as differences in capitalization, spelling, special characters, abbreviations, acronyms, colloquialisms, etc. Although solutions can be provided that include the use of drop down lists, auto suggestion/auto correction, typically the data fields are free form when data entry is applied.

Data or data sets from entities may be batch processed; however, the trend has been towards streaming and processing of data which includes live streaming of data or data sets. Streaming of data allows the ability to support greater volume and increased data traffic and adjusting to particular needs of evolving artificial intelligence (AI), Internet of Things (IoT) and Cloud computing technology. In live operations, new data sources may be added, formats may be changed, data sources may be retired, and errors may be seen for the first time.

Entities may request that a service or data center that processes the data to normalize incoming data streams and provide analytical reports, which can be automatically generated, as to common fields and term lists. This normalization can be related to a particular industry of the entity or customer. Such processes are typically referred to as data ingress and egress operations. Considering that entities or customers can have varying, particular, and specific standards, normalization and translation of incoming data become problematic for a service or data center.

In certain instances when an incorrect normalized value negatively impact's an entity's mission objection, personnel (e.g., data engineers) can implement a software-based quarantine content-zone and work queue. For example, an onsite data engineer has to monitor and work off the quarantine queue. If an incorrect value does not impact the mission objective, a procedure may be to let the incorrect normalized value through even if accuracy is lost. Therefore, there can be a comprise to choose between increasing data stream maintenance burden or reducing data accuracy.

SUMMARY OF THE INVENTION

A method, system, and computer-usable medium for streaming or processing data streams. Raw text data is cleansed to a standard format. A fuzzy matching algorithm is performed on the text data. For data where domain expertise is required, alias matching is performed. End state categorizing or grouping is provided for the cleansed raw text data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for streaming data sets from different data sources using fuzzy matching and alias matching. In certain implementations, a software template residing in a functional behavior assessment (FBA) platform combines data cleansing, fuzzy matching, and alias matching techniques in a three-stage stream processing pipeline. Incoming data sets may be cleansed. The cleansed data sets may be applied with fuzzing matching. The data sets from the fuzzy matching may then be processed with alias matching. Fuzzy matching compares input strings against a list of viable matches, addressing "common sense" level comparisons. In various embodiments, the fuzzy matching implements artificial intelligence (AI) that allows a machine (e.g., information handling system) to approximate matching ability and confidence level. Alias matching can address the instances when that fuzzy matching is not able to address, and particularly when domain expertise is needed to know that two terms mean the same thing. Separating fuzzy matching and alias matching into different pipeline stages defined by expertise boundaries can reduce the complexity of maintaining one ruleset to solve both types of problems and can reduce the customization of each stage.

For the purposes of this disclosure, a computing device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes.

For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
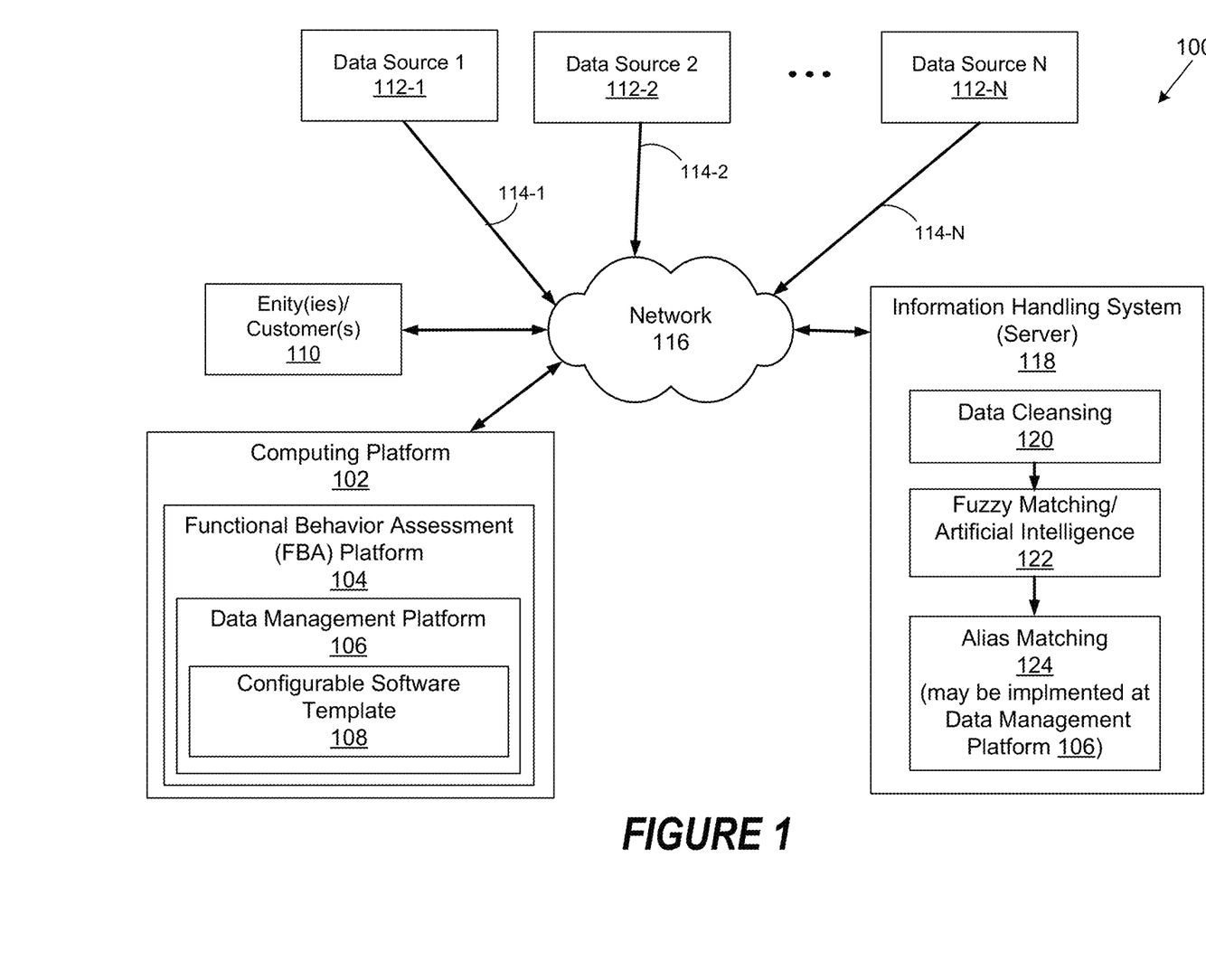
FIG. 1 depicts a system for streaming data sets using fuzzy matching and alias matching.

FIG. 1 is a system for streaming data sets using fuzzy matching and alias matching. The system 100 includes a computing platform 102. As further described below, for certain implementations, the computing platform 102 is an information handling system. In certain implementations, the computing platform 102 is cloud based or a virtual machine. In certain embodiments, the computing platform 102 is a dynamic data protection (DDP) platform and includes a functional behavior assessment (FBA) platform 104, etc. In particular, the computing platform 102 supports user activity monitoring (UAM) that provides an identity management solution. UAM is used by enterprises to manage digital identities and provide secure access to users across multiple devices and applications (e.g., cloud and on-premise based devices and applications). UAM solutions provide a single platform from which information technology and other support entities manage access across a diverse set of users, devices, and applications. In certain implementations, data loss prevention (DLP) and functional behavior assessment (FBA) are part of UAM solutions, where DLP is a strategy that assures end users do not send sensitive or critical information outside a particular network (e.g., corporate network). DLP is also related to applications that assist in controlling what data can be transferred by end users.

In various embodiments, the FBA platform 104 includes a data management platform 106 which is used to support receiving and processing data streams and certain implementations, alias matching of data. An example of the data management platform 106 is Apache NiFi.

In certain embodiments, the data management platform 106 provides for a configurable software template 108. The configurable software template 108 provides for the implementation as described herein of data cleansing, fuzzy matching, and alias matching techniques in a three-stage data stream processing pipeline. Fuzzy matching compares data input strings against a list of viable matches, addressing "common sense" level comparisons, allowing to approximate matching ability and confidence level of an individual with no domain expertise in the field. Alias matching handles the cases fuzzy matching cannot: when domain expertise is needed to know for example that two terms mean the same thing. Separating fuzzy and alias matching into different pipeline stages along expertise boundaries reduces the complexity of maintaining one ruleset to solve both kinds of problems and reduces the customization of each stage.

The configurable software template 108 may be loaded and used to copy and connect processing components without the need to writing particular code. In particular, components or the use of certain components in the described processes can be copied and connected using the configurable software template 108. In particular, the described cleansing and matching steps herein can be configured for various data fields supporting data. In other words, certain data fields (data) may not need a particular step such as domain expertise or alias matching and that step can be bypassed.

In various embodiment, the system 100 provides for entities or customers, as represented by entity(ies)/customer(s) 110 to request the computing platform 102 to receive data from one or more data sources as represented by data source 1 112-1, data source 2 112-2, to data source N 112-N. In certain implementations, the data are streamed. Streaming data is represented as 114-1, 114-2 to 114-N. Other implementations provide for data to be batch processed. The data from data sources 112 may be in different formats, such as text, pdf, graphics, spreadsheet data, email data, etc. and converted to raw text data, In certain instances, such data can be defined by entity(ies)/customer(s) 110 as to particular standardized formatting. The entity(ies)/customer(s) 110 request as to how such data is classified in various end state categories as further described herein.

The system 100 provides for a network 116 that connects the data computing platform 102, entity(ies)/customer(s) 110, data sources 112, and an information handing system (server) 118. In certain embodiments, the network 116 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope, or intent of the invention.

The information handling system 118 is representative of one or more computing systems such as a server nodes that in certain implementations perform particular processes described herein. The information handling system 118 and its processes can be initiated or called by the computing platform 102 and specifically by the FBA platform 104/data management platform 106. As discussed, particular processes or components may be identified using the configurable software template 108.

The information handling system 118 includes a data cleansing component 120. The data cleansing component 120 receives raw text data of the data streams 114 and processes the raw text data to a standardized format for further processing. For example, raw text data is cleansed by removing extra spaces between characters, removing extraneous characters, adjusting capitalization, etc.

In certain implementations, cleansed data is passed on to a fuzzy matching/artificial intelligence (AI) component 122. As further described herein, the cleansed data is classified by the fuzzy matching/artificial intelligence (AI) component 122 into end state categories or groupings, that for example can include certain organizations or agencies. The fuzzy matching/artificial intelligence (AI) component 122 can implement various fuzzy matching algorithms, such as Levenshtein edit distance. Various implementations provide for the fuzzy matching/AI component 122 to compare input strings (i.e., cleansed data) to a list of viable end state category or group matches, addressing "common sense" level comparisons, allowing machine capability to approximate the matching ability and confidence level of an individual with no domain expertise in the field. Certain implementations can also provide for the use of a confidence threshold level in the fuzzy matching process.

In cases where domain expertise is needed to match input strings (i.e., cleansed data) to end state categories or groups, an alias matching component 124 can be implemented. In certain embodiments, the alias matching component 124 may be implemented on the computing platform 102 and can include particular script such as Python code to perform the alias matching.

Figure 2:
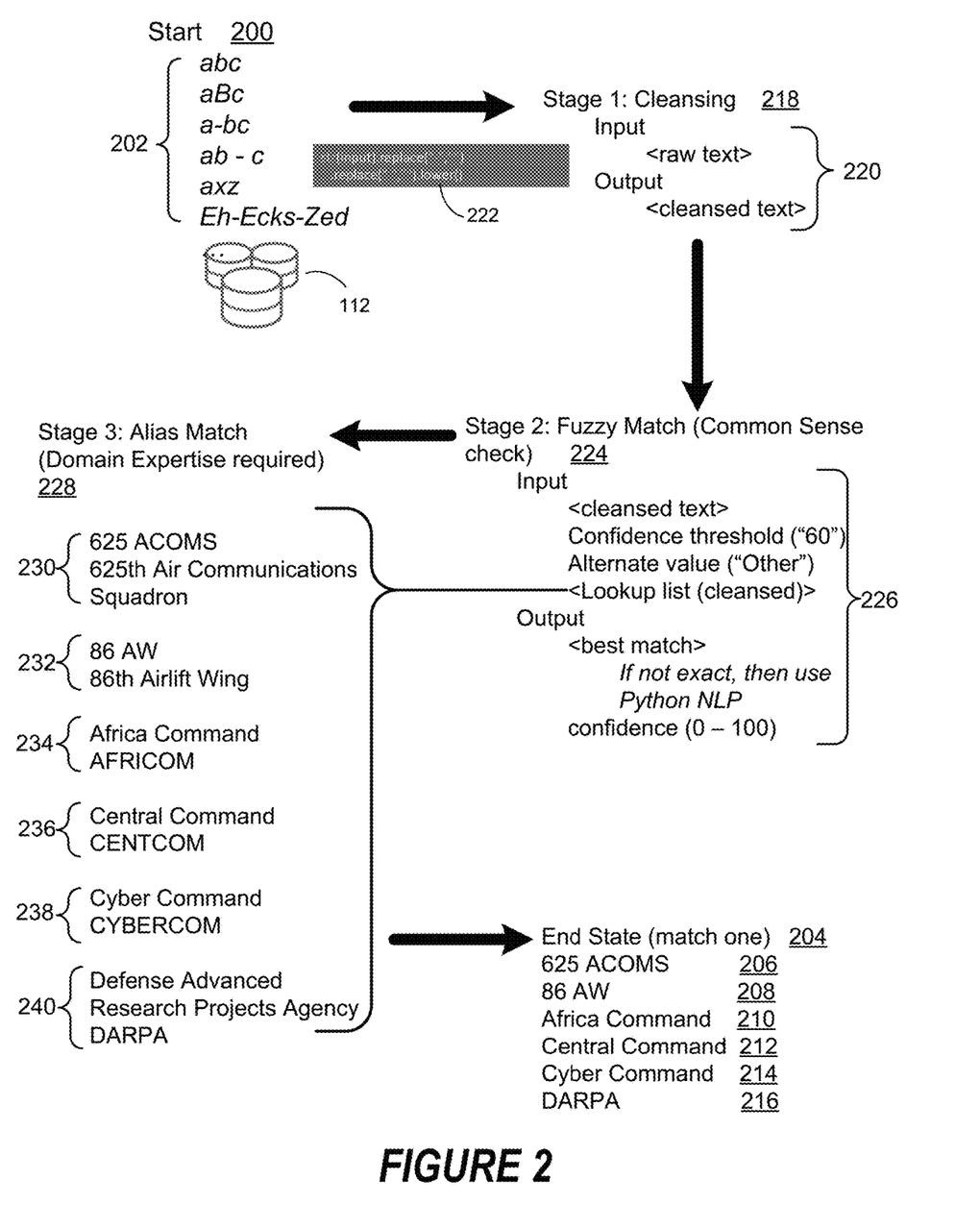
FIG. 2 depicts a process flow for streaming data sets using fuzzy matching and alias matching.

FIG. 2 shows a process flow for streaming data sets using fuzzy matching and alias matching. At start 200, entity(ies)/customer(s) 110 provide or request for raw text data represented by 202 to be processed. The raw text data 202 can be store and sent from data sources 112. The data 202 is ultimately processed and entered as standardized data into one of various end state categories or groups as represented 204. In this example, the categories or groups include 624 ACOMs 206, 86 AW 208, African Command 210, Central Command 212, Cyber Command 214, and DARPA 216.

In certain implementations, the raw text data 202 may be cleansed at stage 1: cleansing 218. The cleansing is represented by 220, where raw text is the input and cleansed text is the output. An example of code (i.e., Python code) that performs cleansing on raw text is represented by 222. Certain implementations can bypass the stage 1: cleansing 218. The stage 1: cleansing 218 and other stages in the process can be defined by the configurable software template 108 described in FIG. 1.

Stage 2: fuzzy matching 224 as described provides a common sense check. The fuzzy matching is represented by 226. An input is cleaned text, and in certain implementations, a confidence threshold value. In certain instances, alternative values can be an input as well. Fuzzy matching algorithms are applied to determine matches of data to particular end state categories or groups 204. The output is a best match; however, if the match is not exact, script may be performed to approximate a best match using a confidence level.

In certain instances, fuzzy matching may not provide a particular or specific match. For various implementations, where domain expertise is required, at stage 3: alias matching 228 can be performed. Therefore, stage 3: alias matching 228 can implement a lookup table that includes different alias for the same category or group. In other words, data may be matched to group under a particular alias that is not found in end state categories or groups 204. Stage 3: alias matching 228 identifies alias of particular categories or groups. For example, group 206 may have aliases 230, group 208 may have aliases 232, group 210 may have aliases 234, group 212 may have aliases 236, group 214 may have aliases 238, and group 216 may have aliases 240. The data identified under a particular alias is grouped with a specific end state category or group 204.

Figure 3:
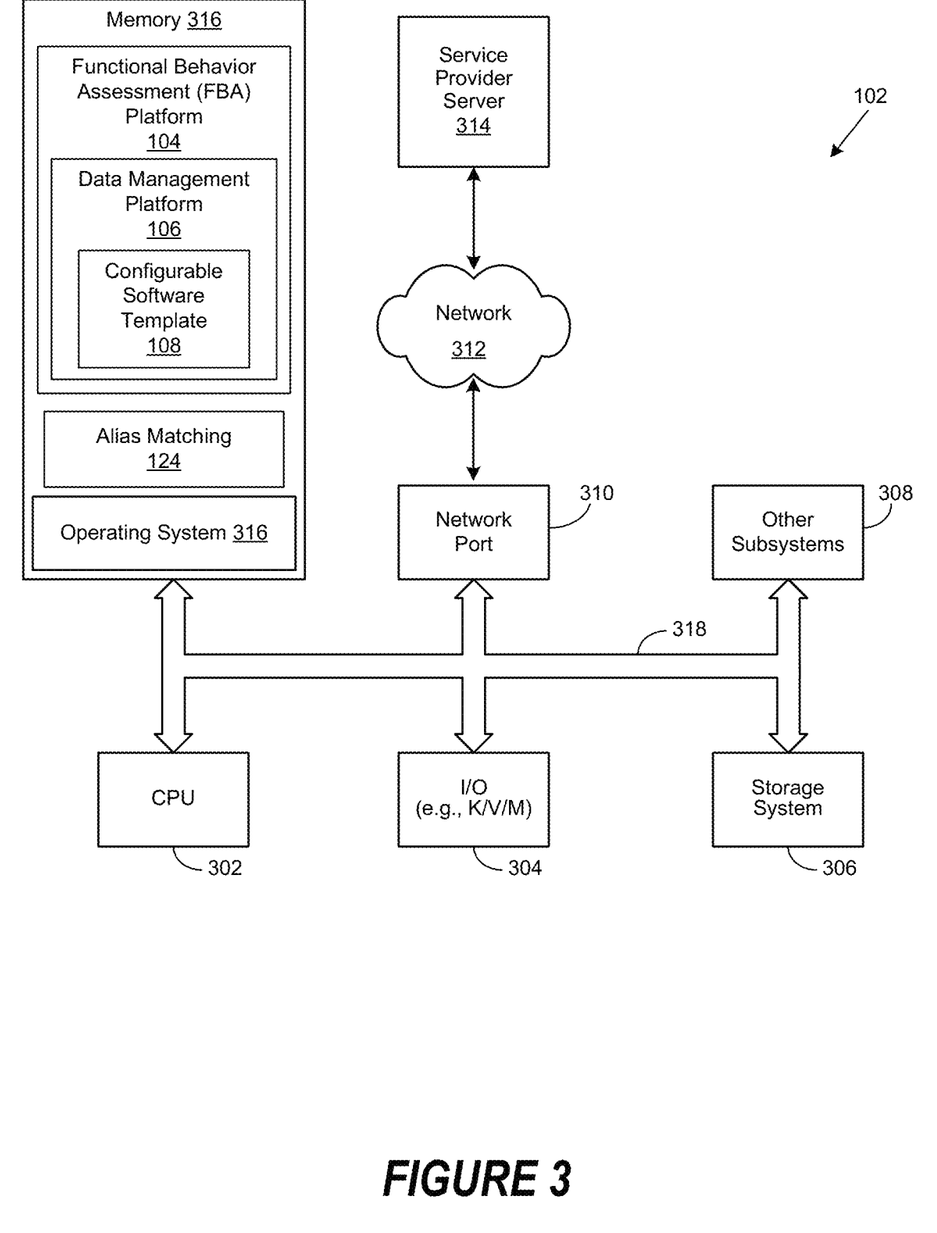
FIG. 3 is a block diagram of an information handling system that implements streaming data sets using fuzzy matching and alias matching.

FIG. 3 is a generalized illustration of an information handling system that implements the computing platform 102 for streaming data sets using fuzzy matching and alias matching. The computing platform 102 includes a processor (e.g., central processor unit or "CPU") 302, input/output (I/O) devices 304, such as a display, a keyboard, a mouse, and associated controllers, a storage system 306, and various other subsystems 308. In various embodiments, the computing platform 102 also includes network port 310 operable to connect to a network 312, which is likewise accessible by a service provider server 314. In certain embodiments, the network 312 is implemented as network 116 of FIG. 1. The computing platform 102 likewise includes system memory 316, which is interconnected to the foregoing via one or more buses 318. System memory 316 further includes operating system (OS) 320 and in various embodiments may also include the FBA platform 104, data management platform 106 and configurable software template 108. In an embodiment, the computing platform 102 is able to download the FBA platform 104, data management platform 106 and configurable software template 108 from the service provider server 314. In another embodiment, the FBA platform 104, data management platform 106 and configurable software template 108 are provided as a service from the service provider server 314. Certain implementations provide for the alias matching component 124 to reside in memory 316.

Figure 4:
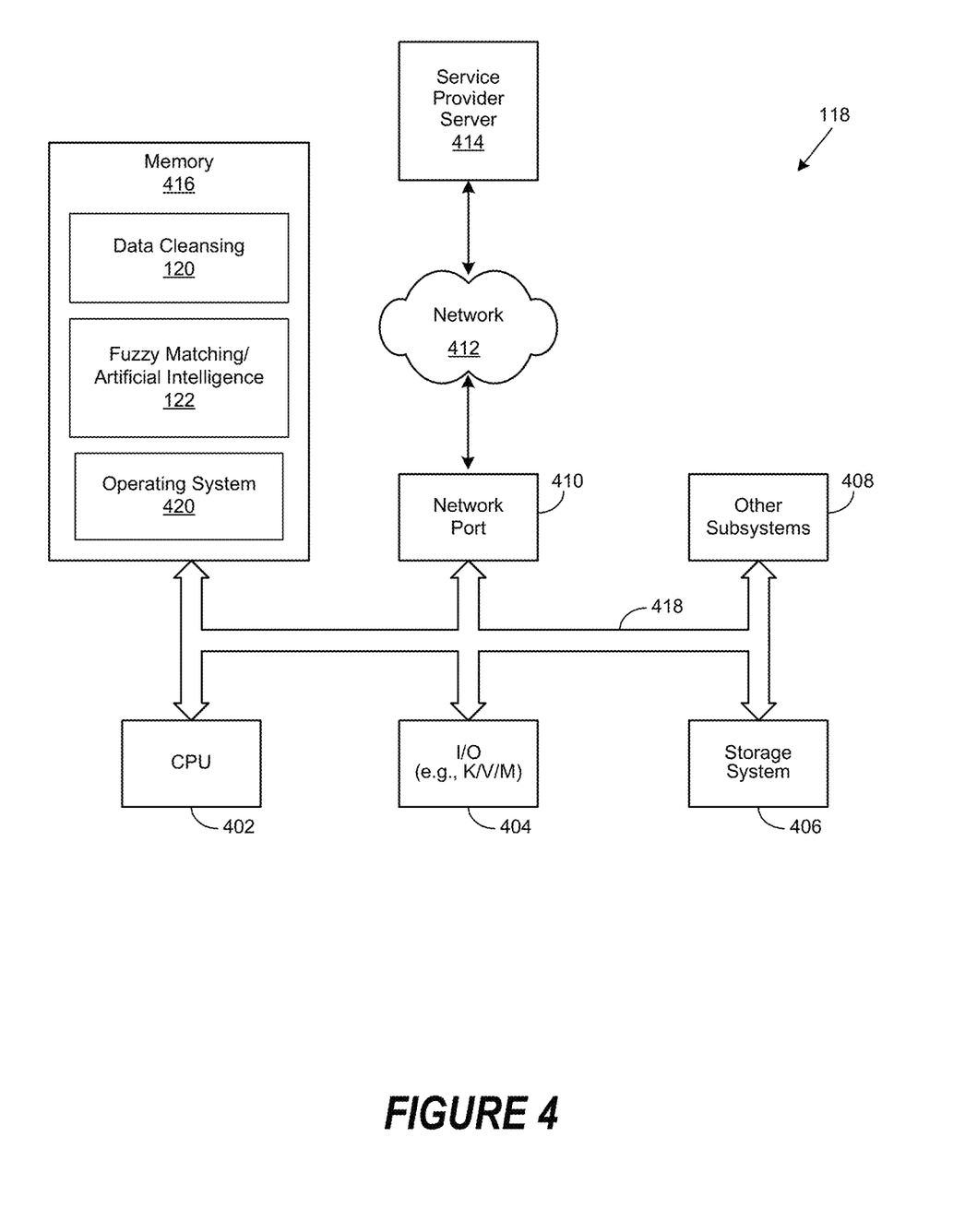
FIG. 4 is a block diagram of an information handling system that performs processes for streaming data sets using fuzzy matching and alias matching.

FIG. 4 is a generalized illustration of an information handling system that performs processes for streaming data sets using fuzzy matching and alias matching. The information handling system 118 can be representative of one or more servers. The information handling system 118 includes a processor (e.g., central processor unit or "CPU") 402, input/output (I/O) devices 404, such as a display, a keyboard, a mouse, and associated controllers, a storage system 406, and various other subsystems 408. In various embodiments, the information handling system 118 also includes network port 410 operable to connect to network 412 which is likewise accessible by service provider server 414. In various embodiments, the network 412 is network 312/network 116 and the service provider 414 is service provider 314. The information handling system 118 likewise includes system memory 416, which is interconnected to the foregoing via one or more buses 418. System memory 416 further includes operating system (OS) 420 and in various embodiments includes the data cleansing component 120 and fuzzy matching/artificial intelligence component 122. Certain implementations provide for the computing platform 102 and particular the FBA platform 104 to call and initiate processes of the information handling system 118 and components, such as data cleansing component 120 and fuzzy matching/artificial intelligence component 122.

Figure 5:
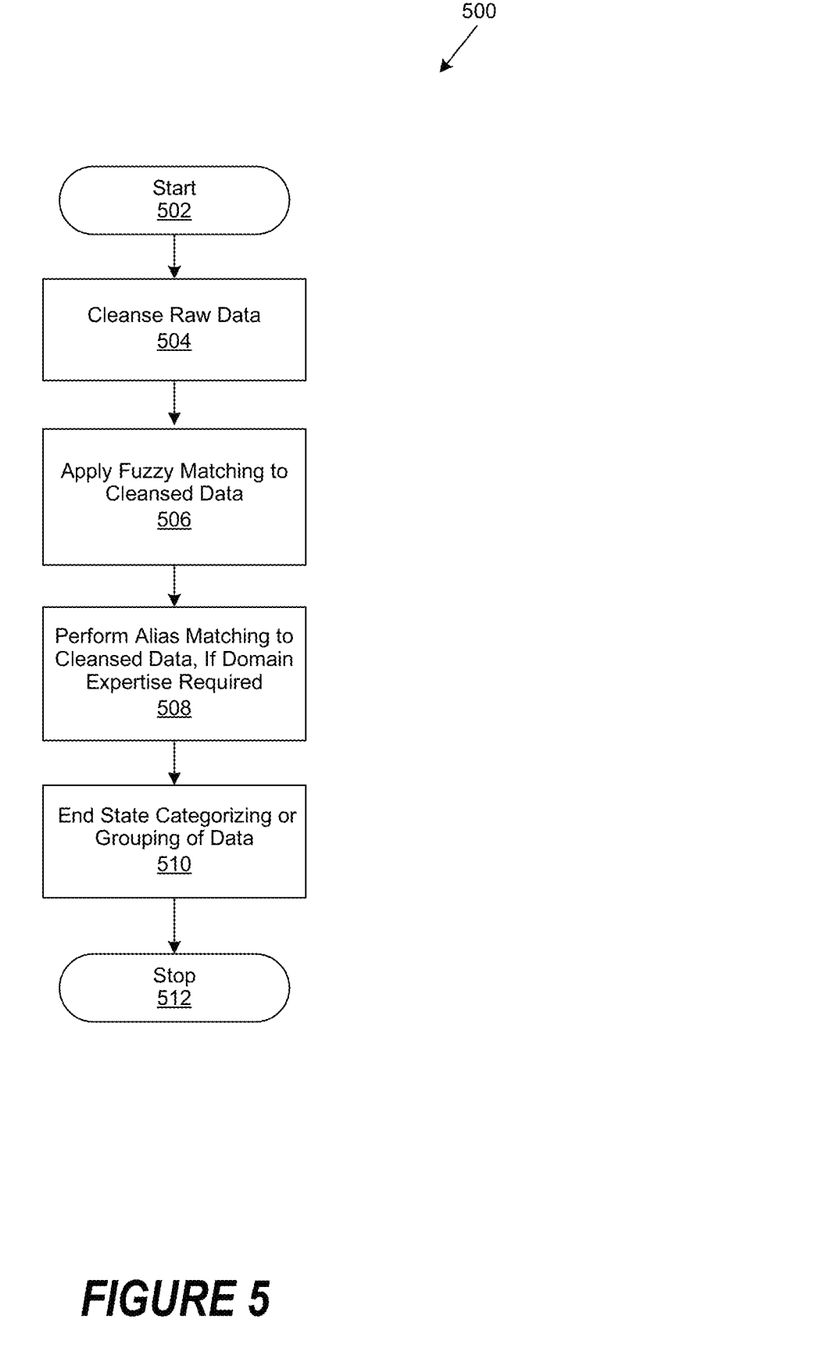
FIG. 5 is generalized flowchart for streaming data sets using fuzzy matching and alias matching.

FIG. 5 is generalized process flow 500 streaming data sets using fuzzy matching and alias matching. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At step 502 the process 500 begins. At step 504, raw text data is cleansed. The raw text data is streamed from one or more data sources, such as data sources 112. The raw text data may include extra spaces, extraneous characters, inconsistency capitalization, etc. Cleansing standardizes the raw text data for further processing. In certain implementations, the step of cleansing may not be needed.

At step 506, a fuzzy matching algorithm is applied. An example of such a fuzzy matching algorithm is Levenshtein edit distance. Other fuzzy matching algorithms may be implemented. The fuzzy matching algorithm determines using a "common sense" approach as to which end state particular data is categorized or grouped to. A threshold confidence or level may be implemented with the fuzzy matching algorithm.

At step 508, alias matching is performed if domain expertise is needed, and particularly if the fuzzy matching is unable to match data to the end state category or group. In certain implementations, a lookup table is used for the alias matching.

At step 510, end state categorizing or grouping of data is performed. The matched data of the data streams is categorized or grouped into specific end state categories As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for streaming data streams comprising:
cleansing raw text data of the data streams;
applying a fuzzy matching algorithm on input strings of cleansed raw text data to a list of viable end state category or group matches based on common sense level comparisons approximating matching ability and confidence levels of individuals with no domain expertise in a field in which the text data applies, to determine an end state category of the cleansed raw text data;
performing alias matching on the cleansed raw text data that has been applied with the fuzzy matching algorithm, if domain expertise is determined to be used for cleansed raw text data;
separating fuzzy and alias matching into different pipeline stages along expertise boundaries; and
providing the end state category of the cleansed raw text data based on the applying the fuzzy matching algorithm.

2. The method of claim 1, wherein a configurable software template of a data management platform determines processes that are implemented for the streaming data streams.

3. The method of claim 1, wherein the raw text data is received from different data sources.

4. The method of claim 1, wherein the fuzzy matching algorithm is Levenshtein edit distance.

5. The method of claim 1, wherein the fuzzy matching algorithm implements a confidence level threshold.

6. The method of claim 1, wherein the alias matching implements a lookup table.

7. The method of claim 1, wherein a best match is performed for the fuzzy matching and alias matching.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
cleansing raw text data of the data streams;
applying a fuzzy matching algorithm on input strings of cleansed raw text data to a list of viable end state category or group matches based on common sense level comparisons approximating matching ability and confidence levels of individuals with no domain expertise in a field in which the text data applies, to determine an end state category of the cleansed raw text data;
performing alias matching on the cleansed raw text data that has been applied with the fuzzy matching algorithm, if domain expertise is determined to be used for cleansed raw text data;
separating fuzzy and alias matching into different pipeline stages along expertise boundaries; and
providing the end state category of the cleansed raw text data based on the applying the fuzzy matching algorithm.

9. The system of claim 8, wherein a configurable software template of a data management platform determines processes that are implemented for the streaming data streams.

10. The system of claim 8, wherein the raw text data is received from different data sources.

11. The system of claim 8, wherein the fuzzy matching algorithm is Levenshtein edit distance.

12. The system of claim 8, wherein the fuzzy matching algorithm implements a confidence level threshold.

13. The system of claim 8, wherein the alias matching implements a lookup table.

14. The system of claim 8, wherein a best match is performed for the fuzzy matching and alias matching.

15. A non-transitory, computer-readable storage medium embodying computer program code, the computer program code comprising computer executable instructions configured for:
cleansing raw text data of the data streams;
applying a fuzzy matching algorithm on input strings of cleansed raw text data to a list of viable end state category or group matches based on common sense level comparisons approximating matching ability and confidence levels of individuals with no domain expertise in a field in which the text data applies, to determine an end state category of the cleansed raw text data;
performing alias matching on the cleansed raw text data that has been applied with the fuzzy matching algorithm, if domain expertise is determined to be used for cleansed raw text data;
separating fuzzy and alias matching into different pipeline stages along expertise boundaries; and
providing the end state category of the cleansed raw text data based on the applying the fuzzy matching algorithm.

16. The non-transitory, computer-readable storage medium of claim 15, wherein a configurable software template of a data management platform determines processes that are implemented for the streaming data streams.

17. The non-transitory, computer-readable storage medium of claim 15, wherein the raw text data is received from different data sources.

18. The non-transitory, computer-readable storage medium of claim 15, wherein the fuzzy matching algorithm is Levenshtein edit distance.

19. The non-transitory, computer-readable storage medium of claim 15, wherein the fuzzy matching algorithm implements a confidence level threshold.

20. The non-transitory, computer-readable storage medium of claim 15 wherein the alias matching implements a lookup table.

* * * * *